(12) United States Patent
Theriault

(10) Patent No.: US 9,841,587 B2
(45) Date of Patent: Dec. 12, 2017

(54) ON-AXIS UNOBSCURED TELESCOPE

(71) Applicant: RAYTHEON COMPANY, Waltham, MA (US)

(72) Inventor: Philip Christopher Theriault, Tucson, AZ (US)

(73) Assignee: RAYTHEON COMPANY, Waltham, MA (US)

( * ) Notice: Subject to any disclaimer, the term of this patent is extended or adjusted under 35 U.S.C. 154(b) by 38 days.

(21) Appl. No.: 14/985,629

(22) Filed: Dec. 31, 2015

(65) Prior Publication Data

US 2017/0192213 A1    Jul. 6, 2017

(51) Int. Cl.
G02B 17/06 (2006.01)
G02B 23/06 (2006.01)

(52) U.S. Cl.
CPC ......... *G02B 17/0631* (2013.01); *G02B 23/06* (2013.01)

(58) Field of Classification Search
CPC . G02B 17/0647; G02B 17/0657; G02B 23/06
USPC .......................... 359/399, 858, 859, 861, 900
See application file for complete search history.

(56) References Cited

U.S. PATENT DOCUMENTS

| | | | |
|---|---|---|---|
| 4,265,510 A | 5/1981 | Cook | |
| 7,682,031 B2 * | 3/2010 | Mann | G02B 13/143 359/857 |
| 8,004,755 B2 * | 8/2011 | Mann | G02B 13/143 359/363 |
| 8,317,345 B2 * | 11/2012 | Mann | G02B 13/143 359/857 |
| 8,937,764 B2 | 1/2015 | Theriault | |
| 2006/0232867 A1 * | 10/2006 | Mann | G02B 13/143 359/858 |
| 2008/0316451 A1 * | 12/2008 | Mann | G02B 13/143 355/53 |
| 2009/0051772 A1 * | 2/2009 | Rhoads | G02B 7/005 348/187 |
| 2010/0134908 A1 * | 6/2010 | Mann | G02B 13/143 359/859 |
| 2010/0202073 A1 * | 8/2010 | Cook | G02B 17/0663 359/858 |
| 2011/0085235 A1 * | 4/2011 | Cook | G02B 17/0652 359/366 |
| 2011/0176205 A1 * | 7/2011 | Shaw | G02B 23/06 359/365 |

(Continued)

*Primary Examiner* — Frank Font
(74) *Attorney, Agent, or Firm* — Lando & Anastasi, LLP

(57) ABSTRACT

Reflective optical telescopes and method of observing a scene. One example of a reflective optical telescope includes a primary mirror positioned along a linear axis extending between an entrance aperture and an image plane, configured to receive optical radiation via the entrance aperture, a secondary mirror positioned along the linear axis and configured to receive the optical radiation from the primary mirror and to reflect the optical radiation in a direction of the primary mirror, wherein the optical radiation received by the primary mirror is unobscured by the secondary mirror, a tertiary mirror positioned along the linear axis and configured to receive the optical radiation from the secondary mirror and reflect the optical radiation in a direction of the primary mirror, and a quaternary mirror positioned along the linear axis, configured to receive the optical radiation from the tertiary mirror and reflect the optical radiation to the image plane.

13 Claims, 17 Drawing Sheets

(56) References Cited

U.S. PATENT DOCUMENTS

| | | | | |
|---|---|---|---|---|
| 2011/0273791 A1* | 11/2011 | Mann | ................... | G02B 13/143 |
| | | | | 359/858 |
| 2012/0019943 A1* | 1/2012 | Spencer | ............. | G02B 17/0631 |
| | | | | 359/859 |
| 2012/0297969 A1* | 11/2012 | King | .................... | F41H 13/005 |
| | | | | 89/41.01 |
| 2013/0063710 A1* | 3/2013 | Mann | ................... | G02B 13/143 |
| | | | | 355/67 |
| 2013/0114156 A1* | 5/2013 | Cook | .................. | G02B 17/061 |
| | | | | 359/858 |
| 2013/0335839 A1* | 12/2013 | Cook | ................ | G02B 17/0636 |
| | | | | 359/857 |
| 2015/0177507 A1 | 6/2015 | Theriault | | |

\* cited by examiner

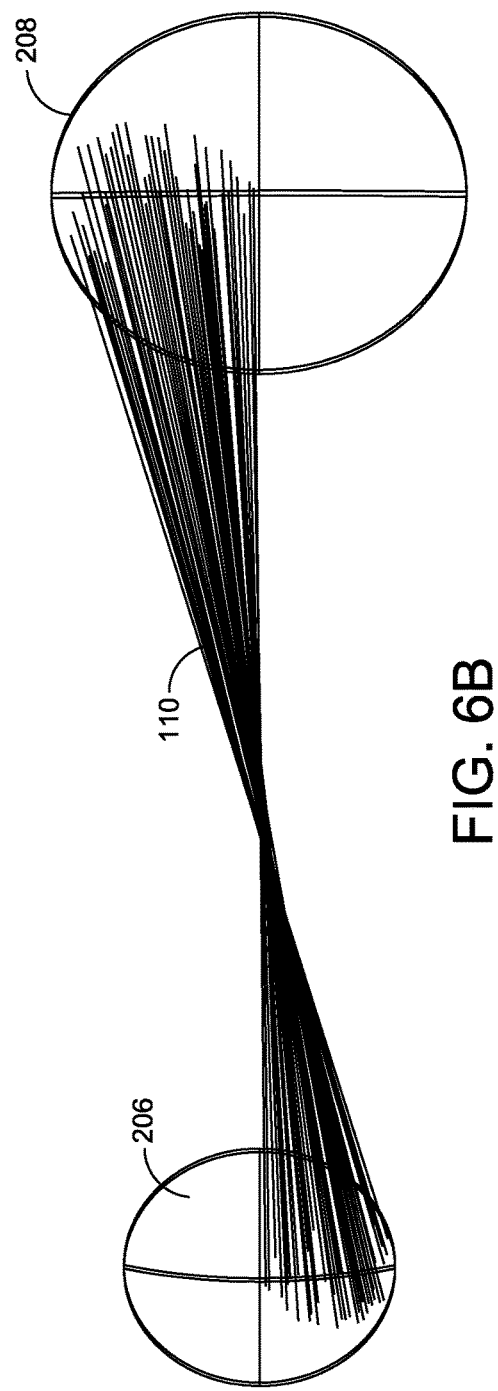
FIG. 6A
FIG. 6B

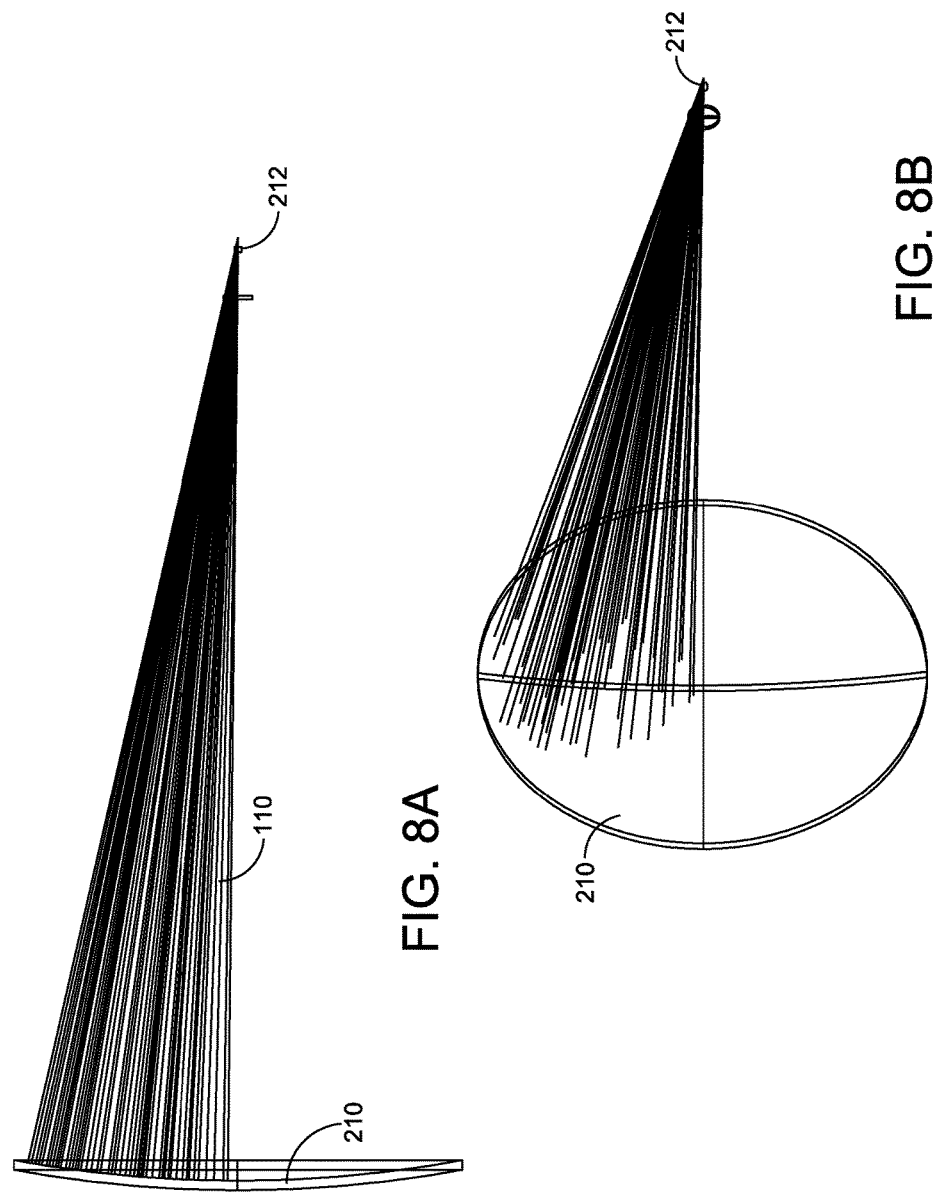

| Surface | Type | Aperture | Radius (minimum) | Radius (maximum) | Mirror Substrate |
|---|---|---|---|---|---|
| OBJ | Standard | | | | |
| 1 | Standard | Circular | 2.171 | 7 | |
| 2 | Standard | Circular | 1.4 | 6 | |
| Stop | Even Asphere | Circular | 1.6 | 6 | Curved, Thickness = 2.40000E-001 |
| 4 | Even Asphere | | | | Curved, Thickness = 8.73781E-002 |
| 5 | Standard | | | | |
| 6 | Even Asphere | | | | Curved, Thickness = 2.00792E-001 |
| 7 | Even Asphere | | | | Curved, Thickness = 2.63835E-001 |
| 8 | Even Asphere | | | | |
| 9 | Even Asphere | | | | |
| 10 | Even Asphere | | | | |
| 11 | Even Asphere | | | | |
| Image | Standard | | | | |

FIG. 16A

| Surface | Coefficient on r2 | Coefficient on r4 | Coefficient on r6 | Coefficient on r8 | Coefficient on r10 | Coefficient on r12 | Coefficient on r14 | Coefficient on r16 |
|---|---|---|---|---|---|---|---|---|
| OBJ | | | | | | | | |
| 1 | | | | | | | | |
| 2 | | | | | | | | |
| Stop | 0 | -1.38877E-05 | -3.23204E-07 | 2.30351E-08 | -9.72384E-10 | 2.15974E-11 | -2.29416E-13 | 8.24322E-16 |
| 4 | 0 | -0.000249033 | -4.53443E-05 | 1.3856E-05 | -2.3533E-06 | -2.48971E-07 | 5.37572E-08 | -2.61335E-09 |
| 5 | | | | | | | | |
| 6 | 0 | -0.00036488 | 2.41747E-05 | -1.65705E-06 | 8.57168E-08 | -2.78494E-09 | 4.805E-11 | -3.11373E-13 |
| 7 | 0 | -1.02577E-05 | -6.48631E-07 | 4.99225E-08 | -2.94851E-09 | 1.00602E-10 | -1.75355E-12 | 1.22837E-14 |
| 8 | 0 | 0.034939819 | 0.32616337 | 0.53280987 | 2.2353136 | 0 | 0 | 0 |
| 9 | 0 | 0.082863522 | 0.90160393 | -0.19438379 | 12.454744 | -23.281393 | -18.22318 | 741.85182 |
| 10 | 0 | -0.020605847 | -0.019307333 | 3.8231267 | 22.134589 | 209.41652 | -369.4526 | -1749.3431 |
| 11 | 0 | -0.011901032 | -1.1622595 | 5.6674911 | 40.550874 | 81.022266 | -465.37935 | 1857.1792 |
| Image | | | | | | | | |

ON-AXIS UNOBSCURED TELESCOPE

BACKGROUND

Optical imaging systems typically comprise a detector, usually placed within a housing having an aperture through which the detector may view an external scene, and a telescope that images the external scene. The telescope projects a high quality image of predetermined magnification onto the detector. Certain optical imaging applications require the ability to position the telescope in a constrained volume or cross section. Accordingly, for many applications, the telescope must be as compact as possible, while remaining consistent with the required optical performance for high quality imaging. Since the diffraction limited imaging resolution is limited by the aperture size of the imaging system, in many missile system applications the aperture consumes a very large fraction of the frontal cross-section of the missile system in order to achieve the desired imaging resolution.

Some conventional telescopes have used off-axis optical system arrangements. However, such off-axis designs generally do not maximize the available aperture size, and unnecessarily increase the cost of the telescope system. Other known configurations that maximize the use of the fraction of missile cross-section that is available for the optical system include obscured on-axis telescopes. While these configurations may better use the shape and volume available in the missile system, they adversely affect optical performance as a result of diffraction effects caused by the secondary mirror and secondary mirror support structures of the on-axis system.

SUMMARY OF THE INVENTION

Aspects and embodiments are directed to an on-axis unobscured telescope based on the design principles of an axisymmetric telescope, and a method of using the same. In particular, according to one embodiment, the telescope includes a plurality of on-axis mirrors that may be aligned using standard axisymmetric features while removing the central obscuration of known axisymmetric telescopes. Such aspects and embodiments enable a compact telescope that avoids undesirable diffraction effects experienced by known axisymmetric telescopes.

At least one aspect described herein is directed to a reflective optical telescope. In one embodiment, the reflective optical telescope may include a primary mirror positioned along a linear principal axis that extends between an entrance aperture of the reflective optical telescope and an image plane, and configured to receive optical radiation via the entrance aperture, a secondary mirror positioned along the linear principal axis and configured to receive the optical radiation reflected from the primary mirror and to reflect the optical radiation in substantially a direction of the primary mirror and across the linear principal axis, wherein the optical radiation received by the primary mirror is unobscured by the secondary mirror, a tertiary mirror positioned along the linear principal axis and configured to receive the optical radiation reflected from the secondary mirror and to reflect the optical radiation in a direction of the primary mirror; and a quaternary mirror positioned along the linear principal axis and configured to receive the optical radiation reflected from the tertiary mirror and to reflect and focus the optical radiation to the image plane.

According to an embodiment, the primary mirror includes a first portion positioned on a first side of the linear principal axis and a second portion positioned on a second side of the linear principal axis, and one of the first portion and the second portion of the primary mirror is removed. In one embodiment, the secondary mirror includes a first portion positioned on the first side of the linear principal axis and a second portion positioned on the second side of the linear principal axis. In a further embodiment, one of the first portion and the second portion of the secondary mirror is removed. In another embodiment, the tertiary mirror includes a first portion positioned on the first side of the linear principal axis and a second portion positioned on the second side of the linear principal axis, and one of the first portion and the second portion of the tertiary mirror is removed. According to one embodiment, the quaternary mirror includes a first portion positioned on the first side of the linear principal axis and a second portion positioned on the second side of the linear principal axis, and one of the first portion and the second portion of the quaternary mirror is removed. According to one embodiment, at least one of the second portion of the primary mirror, the first portion of the primary mirror, the second portion of the tertiary mirror, and the second portion of the quaternary mirror is substantially transparent to the optical radiation.

In an embodiment, the primary mirror has a first reflective surface configured to receive and reflect the optical radiation, the secondary has a second reflective surface configured to receive and reflect the optical radiation, the tertiary has a third reflective surface configured to receive and reflect the optical radiation, and the quaternary mirror has a fourth reflective surface configured to receive and reflect the optical radiation. In a further embodiment, the primary mirror has a first back surface distal the first reflective surface, the quaternary mirror has a second back surface distal the fourth reflective surface, and the primary mirror and the quaternary mirror are positioned such that the first and second back surfaces face one another.

According to one embodiment, the primary mirror is positioned entirely on a first side of the linear principal axis. In an embodiment, the secondary mirror is positioned entirely on a second side of the linear principal axis and configured to reflect the optical radiation across the linear principal axis to the tertiary mirror. In a further embodiment, the secondary mirror is a convex mirror. According to one embodiment, the tertiary mirror is positioned entirely on the first side of the linear principal axis. In an embodiment, the quaternary mirror is positioned entirely on the first side of the linear principal axis.

According to another aspect provided is a reflective optical telescope. In an embodiment, the reflective optical telescope includes a primary mirror positioned on a first side of a linear principal axis that extends between an entrance aperture of the reflective optical telescope and an image plane, the primary mirror configured to receive optical radiation via the entrance aperture and to reflect the optical radiation, the reflective optical telescope configured to direct the optical radiation from the entrance aperture to the image plane, a secondary mirror positioned along and on a second side of the linear principal axis and configured to receive the optical radiation reflected from the primary mirror and to reflect the optical radiation past the primary mirror toward the image plane and across the linear principal axis, a tertiary mirror positioned along and on the first side of the linear principal axis and configured to receive the optical radiation reflected from the secondary mirror and to further reflect the optical radiation in a direction of the primary mirror, and a quaternary mirror configured to receive the optical radiation reflected from the tertiary mirror and to further reflect the optical radiation to the image plane.

In an embodiment, the primary mirror has a first reflective surface configured to receive and reflect the optical radiation and a first opposing back surface, the quaternary mirror has a second reflective surface configured to receive and reflect the optical radiation and a second opposing back surface, and the primary mirror and the quaternary mirror are positioned such that the first and second opposing back surfaces face one another. In a further embodiment, the secondary mirror has a third reflective surface configured to receive and reflect the optical radiation and a third opposing back surface, the tertiary mirror has a fourth reflective surface configured to receive and reflect the optical radiation and a fourth opposing back surface, and the secondary mirror is positioned such that the third opposing back surface faces the entrance aperture and the tertiary mirror is positioned such that the fourth opposing back surface faces the image plane.

According to an aspect, provided is a method of observing a scene. In an embodiment, the method may include receiving optical radiation from a viewed scene at a primary mirror positioned along a linear principal axis that extends between an entrance aperture of a reflective optical telescope and an image plane, reflecting the optical radiation from the primary mirror to a secondary mirror positioned along the linear principal axis, the secondary mirror being positioned relative to the primary mirror such that the secondary mirror does not obscure any portion of the entrance aperture and the optical radiation received by the primary mirror is unobscured by the secondary mirror, directing the optical radiation with the secondary mirror in substantially a direction of the primary mirror and across the linear principal axis, receiving the optical radiation directed from the secondary mirror at a tertiary mirror positioned along the linear principal axis, reflecting the optical radiation from the tertiary mirror to a quaternary mirror positioned along the linear optical axis, and directing the optical radiation to the image plane with the quaternary mirror.

In an embodiment, the primary mirror includes a first portion positioned on a first side of the linear principal axis and a second portion positioned on a second side of the linear principal axis, and receiving optical radiation from a viewed scene at a primary mirror includes receiving the optical radiation at one of the first portion and the second portion of the primary mirror. According to a further embodiment, the other of the first portion and the second portion of the primary mirror is removed.

In one embodiment, the secondary mirror includes a first portion positioned on the first side of the linear principal axis and a second portion positioned on the second side of the linear principal axis, and receiving the optical radiation from the primary mirror includes receiving the optical radiation at one of the first portion and the second portion of the secondary mirror. In a further embodiment, the other of the first portion and the second portion of the secondary mirror is removed.

According to an embodiment, the tertiary mirror includes a first portion positioned on the first side of the linear principal axis and a second portion positioned on the second side of the linear principal axis, and receiving the optical radiation directed from the secondary mirror includes receiving the optical radiation at one of the first portion and the second portion of the tertiary mirror. In a further embodiment, the other of first upper portion and the second portion of the tertiary mirror is removed.

In one embodiment, the quaternary mirror includes a first portion positioned on the first side of the linear principal axis and a second portion positioned on the second side of the linear principal axis, and receiving the optical radiation from the tertiary mirror includes receiving the optical radiation at one of the first portion and the second portion of the quaternary mirror. In a further embodiment, the other of the first portion and the second portion of the quaternary mirror is removed.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures:

FIGS. 6A and 6B are partial ray traces showing an example of reflection from the secondary mirror to the tertiary mirror of the telescope shown in FIG. 2, according to certain aspects of the present invention;

FIGS. 8A and 8B are partial ray traces showing an example of reflection from the quaternary mirror to the image plane of the telescope shown in FIG. 2, according to certain aspects of the present invention;

FIGS. 16A and 16B are tables showing an example of an optical prescription for the telescope shown in FIG. 9.

DETAILED DESCRIPTION

Figure 15:
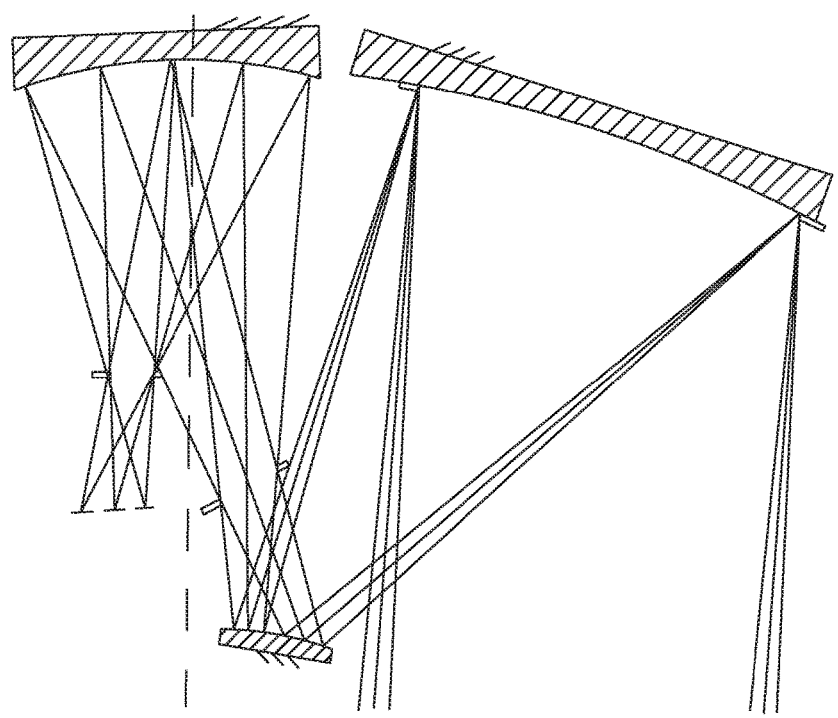
FIG. 15 is a schematic diagram of one example of an optical layout of an off-axis reflective telescope having a sideways linear series of mirrors.

Aspects and embodiments are directed to an on-axis unobscured telescope design and a method of using the same. As discussed above, the diffraction limited imaging resolution is limited by the aperture size of the telescope; however, in many applications, the aperture size is limited by the frontal cross-section of the system, which can be constrained by packaging requirements. For example, this is often the case in missile systems because a missile has aerodynamic requirements that restrict the size of the frontal cross-section. Furthermore, as discussed above, the central obscuration in symmetric reflective telescopes lowers the performance possible for a telescope of given aperture size through diffraction effects caused by the secondary mirror and its supporting structure. Conventionally, this problem is avoided by using an off-axis (or non-axisymmetric) reflective telescope configuration that consists of a linear series of off-axis mirrors to avoid the obscuration; however, off-axis designs are less space efficient and more expensive than on-axis designs, and lower the aperture available in a constrained volume or cross section (such as in a missile). Off-axis designs are therefore undesirable in certain applications, including those where the packaging space is limited in cross-section. One example of an off-axis reflective telescope configuration that includes a sideways linear series of mirrors is shown in FIG. 15.

Aspects and embodiments address the discussed deficiencies and provide an improved telescope. In particular, according to certain embodiments, there is provided an unobscured reflective telescope including a plurality of on-axis mirrors that may be aligned using standard axisymmetric features while removing the central obscuration that lowers performance in conventional axisymmetric reflective telescopes. Such aspects and embodiments enable a compact telescope that avoids diffraction effects experienced by the central obscuration in standard on-axis reflective telescopes, in particular due to the conventional positioning of the secondary mirror.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

Figure 1:
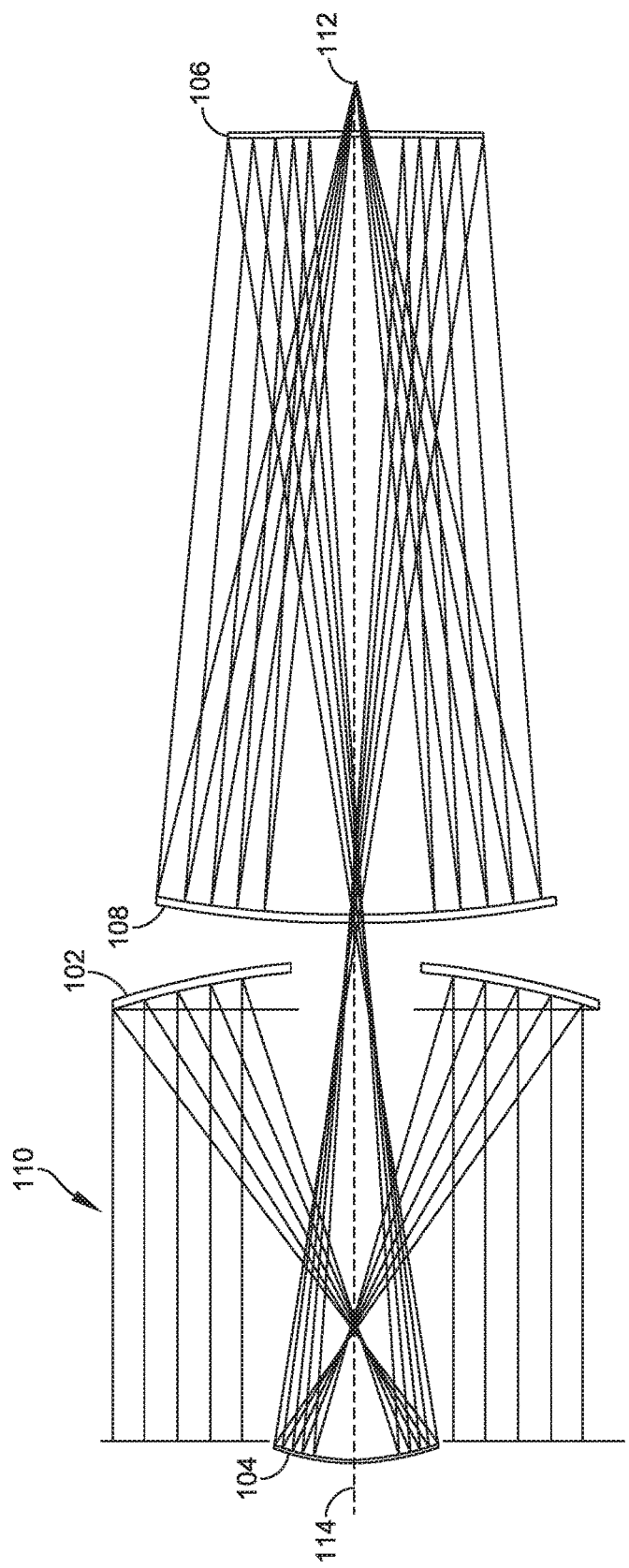
FIG. 1 is a schematic diagram of one example of an optical layout of an on-axis reflective telescope.

Referring to FIG. 1, there is illustrated one example of an on-axis reflective telescope. The telescope includes a primary mirror 102, a secondary mirror 104, a tertiary mirror 106, and a quaternary mirror 108. The four mirrors are axisymmetric about the central optical axis 114. The primary mirror 102 receives optical radiation 110 from an external scene via an entrance aperture of the system, and the radiation 110 is directed via the secondary, tertiary, and quaternary mirrors 104, 106, 108 to an image plane 112. The optical radiation includes the flow of radiant energy formed by oscillating electric and magnetic disturbances, and for example, may include infrared radiation, visible light, and ultraviolet radiation. As shown, the radiation 110 reflected from the secondary mirror 104 passes through a central aperture in the primary mirror 102 and a central aperture in the quaternary mirror 108. The optical radiation 110 is reflected from the tertiary mirror 106 and directed to the quaternary mirror 108. After reflecting from the quaternary mirror 108, the radiation passes through a central aperture in the tertiary mirror 106 to the image plane 112. An imaging detector may be located at the image plane 112. While allowing greater use of the system entrance aperture, the central obscuration caused by the secondary mirror (and its associated support structure, not shown in FIG. 1) in the configuration shown in FIG. 1 creates undesirable diffraction effects, as noted above.

According to certain embodiments, and as demonstrated and discussed further below, by using a convex secondary mirror (e.g., secondary mirror 104) (such as in Gregorian telescope) approximately "half" of the telescope of FIG. 1 can be used alone, thereby avoiding the central obscuration present in the conventional configuration and providing an unobscured reflective telescope that is still based on the arrangement and design principles of the standard on-axis/axisymmetric configuration. Thus, embodiments of the unobscured telescope disclosed herein advantageously retains the cross section efficient on-axis alignment of the Gregorian telescope mirrors and, in applications with limited dimensions such as missiles, use of a large fraction of the available cross section, while providing enhanced performance by avoiding the diffraction effects associated with the central obscuration in conventional designs.

Figure 2:
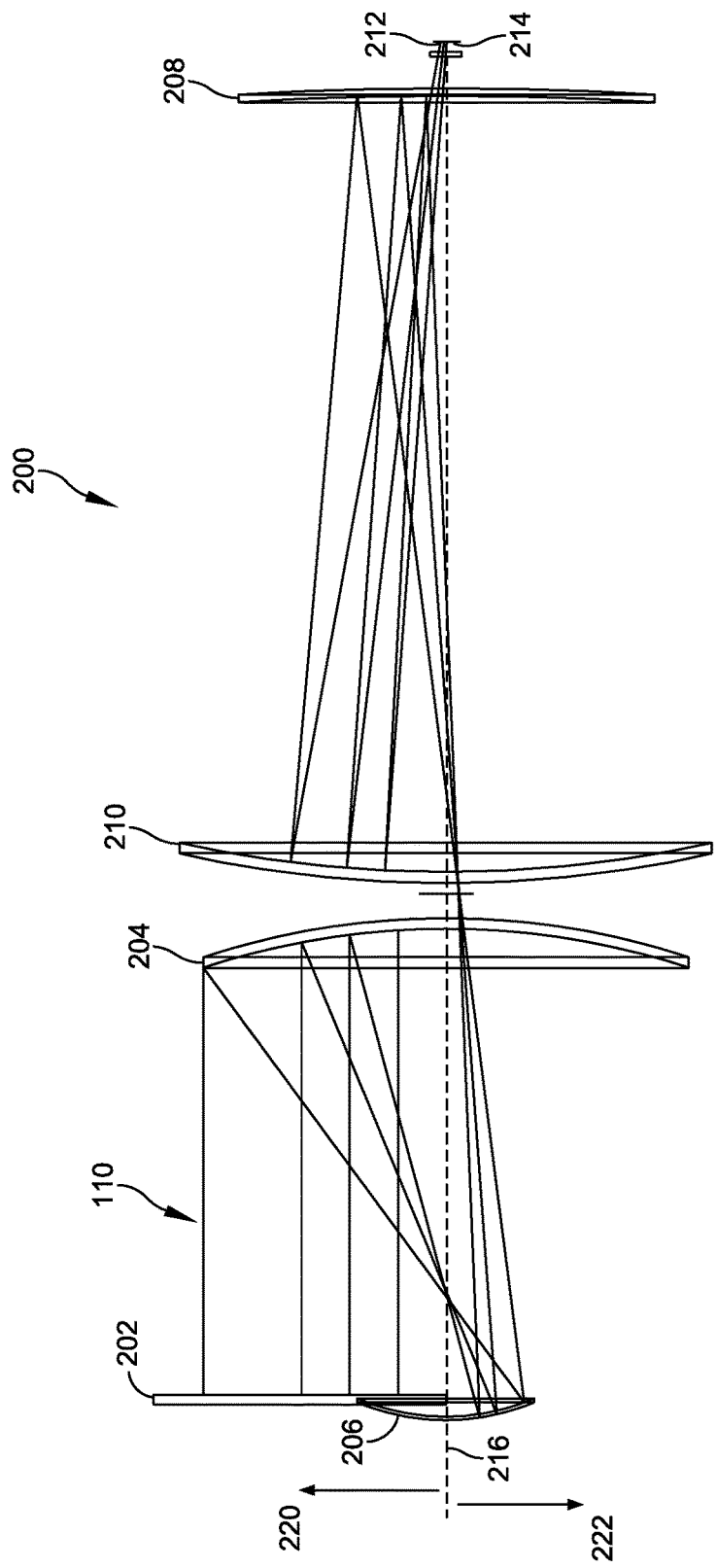
FIG. 2 is a ray trace corresponding to one example of an on-axis unobscured telescope, according to certain aspects of the present invention.

Referring to FIG. 2, there is illustrated a ray trace for a half primary mirror aperture in one example of an unobscured reflective telescope according to certain embodiments. The telescope 200 includes an entrance aperture 202, a primary mirror 204, a convex secondary mirror 206, a tertiary mirror 208, a quaternary mirror 210, and an image plane 212. One or more imaging detectors 214 may be placed at the image plane 212. The telescope 200 may be arranged in a housing (not shown) designed to be positioned with a missile (e.g., the nose of a missile). As discussed above, the primary mirror 204 receives optical radiation 110 from an external scene via the entrance aperture 202, and the optical radiation 110 is directed via the secondary, tertiary, and quaternary mirrors 206, 208, 210 to the image plane 112.

As shown in FIG. 2, the primary mirror 204, the secondary mirror 206, the tertiary mirror 208, and the quaternary mirror 210 are axisymmetric about a linear principal axis 216 that extends between the entrance aperture 202 of the telescope 200 and the image plane 212. The linear principal axis 216 of various embodiments provides a virtual guide dividing the telescope into two portions (i.e., sides). The first side is shown in FIG. 2 as an upper side, and the second side is shown in FIG. 2 as a lower side. A first arrow 220 indicates a direction of the first side, and a second arrow 222 indicates a direction of the second side in FIG. 2. As may be seen in the ray trace shown in FIG. 2, and as demonstrated further below and with reference to at least FIGS. 3A-3D, the optical radiation 110 received via the entrance aperture 202 can be directed to the image plane 212 using only approximately one half (upper or lower sides) of each of the four mirrors 204, 206, 208, and 210. Accordingly, in such an arrangement the secondary mirror 206 no longer forms a central obscuration, and telescope 200 has an unobscured design.

Turning now to FIGS. 3A-3D, shown are diagrams illustrating the optical radiation incident on the primary mirror 204, secondary mirror 206, tertiary mirror 208, and quaternary mirror 210 of the telescope of FIG. 2. As shown in the referenced figures, the entire surface of the primary, secondary, tertiary, and quaternary mirror 204, 206, 208, 210 is not needed to receive and reflect the optical radiation. That is, ray paths of the optical radiation received through the entrance aperture 202 of the telescope 200 may be effectively directed to avoid central obscurations with only a portion (e.g., a "half") of the primary, secondary, tertiary, and quaternary mirror 204, 206, 208, and 210.

Figure 3B:
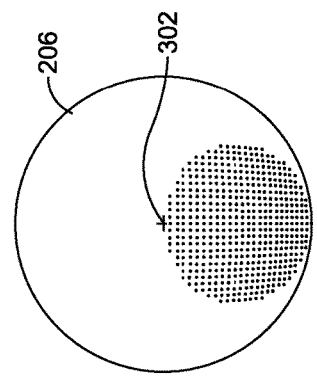
FIG. 3B is a diagram illustrating an example of optical radiation incident on the secondary mirror of the telescope shown in FIG. 2, according to certain aspects of the present invention.
Figure 3D:
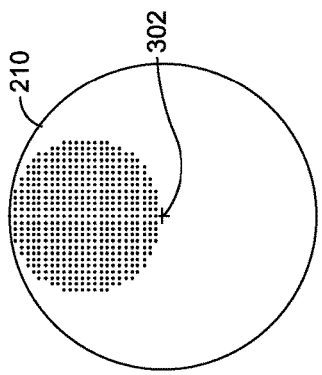
FIG. 3D is a diagram illustrating an example of optical radiation incident on the quaternary mirror of the telescope shown in FIG. 2, according to certain aspects of the present invention.
Figure 3A:
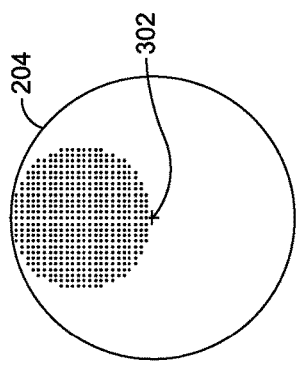
FIG. 3A is a diagram illustrating an example of optical radiation incident on the primary mirror of the telescope shown in FIG. 2, according to certain aspects of the present invention.
Figure 4:
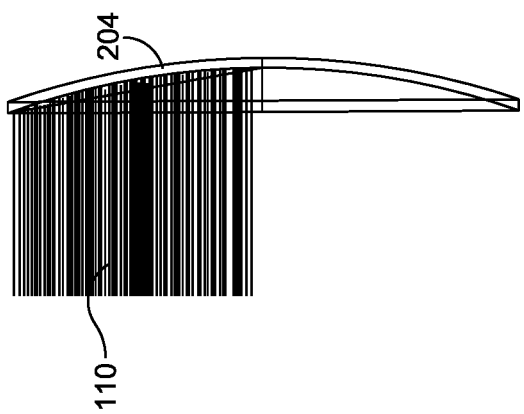
FIG. 4 is a partial ray trace showing an example of optical radiation received at the primary mirror of the telescope shown in FIG. 2, according to certain aspects of the present invention.

Referring to FIG. 3A, illustrated is a diagram showing the optical radiation 110 received at the primary mirror 204 of the telescope 200 shown in FIG. 2, according to various aspects. FIG. 4 shows a corresponding ray trace of the optical radiation 110 incident on the primary mirror 204. The linear principal axis 216 is indicated as virtual point 302 in FIG. 3A. As shown, in at least one embodiment, the optical radiation 110 received via the entrance aperture 202 arrives at a first portion of the primary mirror 204. The first portion is shown as the upper "half" of the mirror, or portion extending above the linear principal axis 216 indicated by point 302. As shown, the ray bundle of the radiation 110 is entirely constrained to the first portion of the primary mirror 204. Accordingly, a second portion extending below the linear principal axis 216 may be removed or omitted to reduce the size and weight of the telescope 200.

Figure 5B:
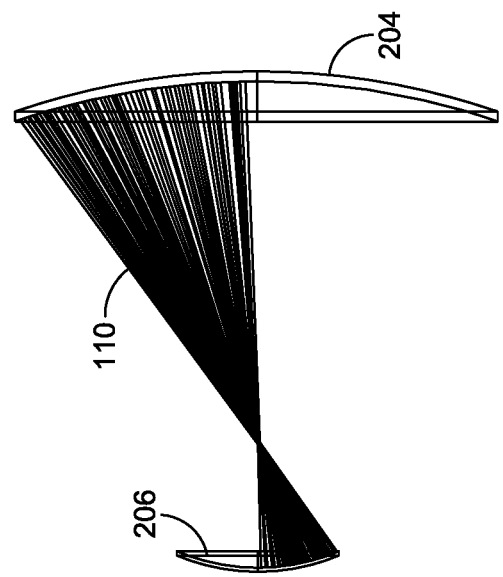
FIGS. 5A and 5B are partial ray traces showing an example of reflection from the primary mirror to the secondary mirror of the telescope shown in FIG. 2, according to certain aspects of the present invention.
Figure 5A:
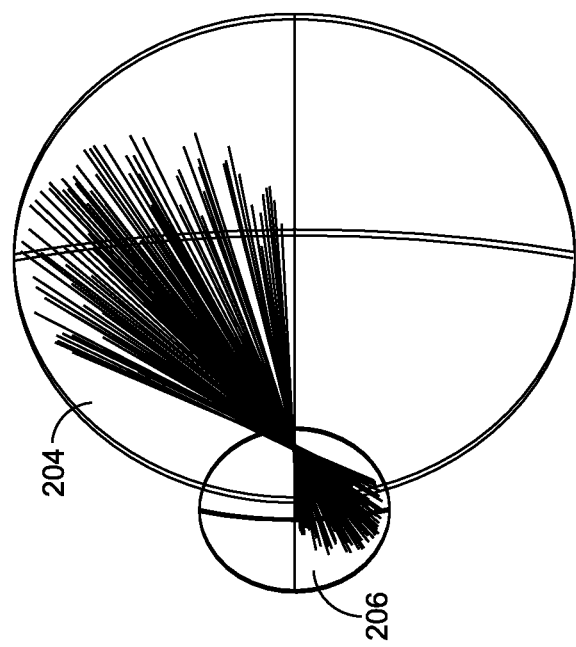

Referring to FIG. 3B, illustrated is a diagram showing the optical radiation 110 incident on the secondary mirror 206 of the telescope 200 show in FIG. 2, according to various aspects. FIGS. 5A and 5B are corresponding partial ray traces showing an example of reflection of the optical radiation 110 from the primary mirror 204 to the secondary mirror 206. The linear principal axis 216 is also indicated in FIG. 3B as virtual point 302. As shown, in at least one embodiment, optical radiation reflected from the primary mirror 204 arrives at a second portion of the secondary mirror 206. The second portion is shown as the lower "half" of the mirror, or portion extending below the linear principal axis 216 indicated by the virtual point 302. As shown, the ray bundle of the radiation 110 is entirely constrained to the first portion of the primary mirror 204 and second portion of the secondary mirror 206. Accordingly, a first portion of the secondary mirror 206 extending above the linear principal axis 216 may be removed to further reduce the size and weight of the telescope 200.

Figure 3C:
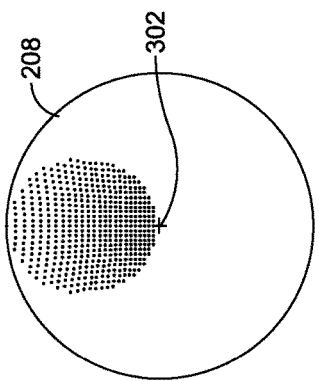
FIG. 3C is a diagram illustrating an example of optical radiation incident on the tertiary mirror of the telescope shown in FIG. 2, according to certain aspects of the present invention.

Referring to FIG. 3C, illustrated is a diagram showing the optical radiation 110 incident on the tertiary mirror 208 of the telescope 200 show in FIG. 2, according to aspects of the invention. The linear principal axis 216 is also indicated in FIG. 3C as virtual point 302. FIGS. 6A and 6B are corresponding partial ray traces showing an example of reflection of the optical radiation 110 from the secondary mirror 206 to the tertiary mirror 208. As shown, in at least one embodiment, optical radiation reflected from the secondary mirror 206 arrives at a first portion of the tertiary mirror 208. The first portion is shown as the upper half or portion of the tertiary mirror extending above the linear principal axis 216 indicated in FIG. 3C by virtual point 302. As shown, the ray bundle of the radiation 110 is entirely constrained to the second portion of the secondary mirror 206 and the first portion of the tertiary mirror 208. Accordingly, a second portion of the tertiary mirror 208 extending below the linear principal axis 216 may be removed or omitted to additionally reduce the size and weight of the telescope 200.

Figure 7A:
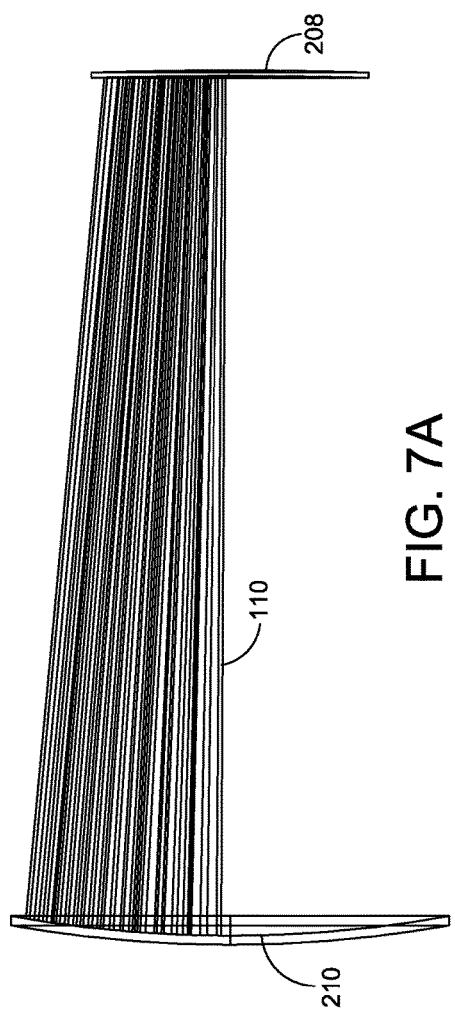
FIGS. 7A and 7B are partial ray traces showing an example of reflection from the tertiary mirror to the quaternary mirror of the telescope shown in FIG. 2, according to certain aspects of the present invention.
Figure 7B:
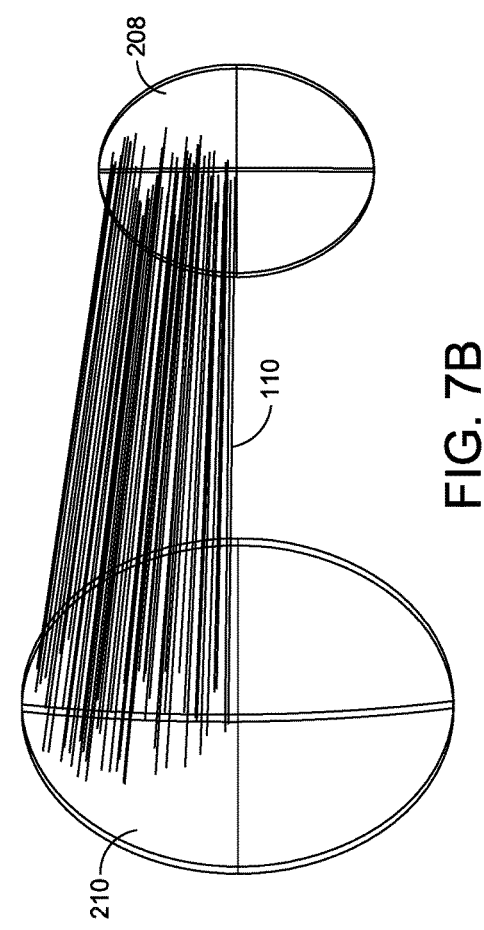

Referring to FIG. 3D, illustrated is a diagram showing optical radiation incident on the quaternary mirror 210 of the telescope 200 shown in FIG. 2, according to various aspects. The linear principal axis 216 is also indicated in FIG. 3D as virtual point 302. FIGS. 7A and 7B are corresponding partial ray traces showing an example of reflection of the optical radiation 110 from the tertiary mirror 208 to the quaternary mirror 210. As shown, in at least one embodiment, optical radiation reflected from the tertiary mirror 208 arrives at a first portion of the quaternary mirror 210. The first portion is shown as the upper half or portion of the quaternary mirror 210 extending above the linear principal axis 216 indicated as virtual point 302. As shown, the ray bundle is entirely constrained to the first portion of the tertiary mirror 208 and first portion of the quaternary mirror 210. Accordingly, a second portion of the quaternary mirror 210 extending below the linear principal axis 216 may be removed or omitted to further reduce the size and weight of the telescope 200. FIGS. 8A and 8B are further partial ray traces showing an example of reflection and focusing of the optical radiation 110 from the portion of the quaternary mirror 210 onto the image plane 212.

Accordingly, various aspects and embodiments provide a four mirror reflective telescope in which each of the mirrors can have at least a portion removed. While the mirrors can be positioned and aligned relative to one another using axisymmetric techniques, embodiments of this telescope do not suffer the same negative effects of central obscuration as is the case in conventional axisymmetric telescopes. Further, such aspects and embodiments reduce the cost and/or weight of the telescope. Based on these principles, an unobscured reflective telescope, such as that shown in FIG. 9, for example, can be constructed.

Figure 9:
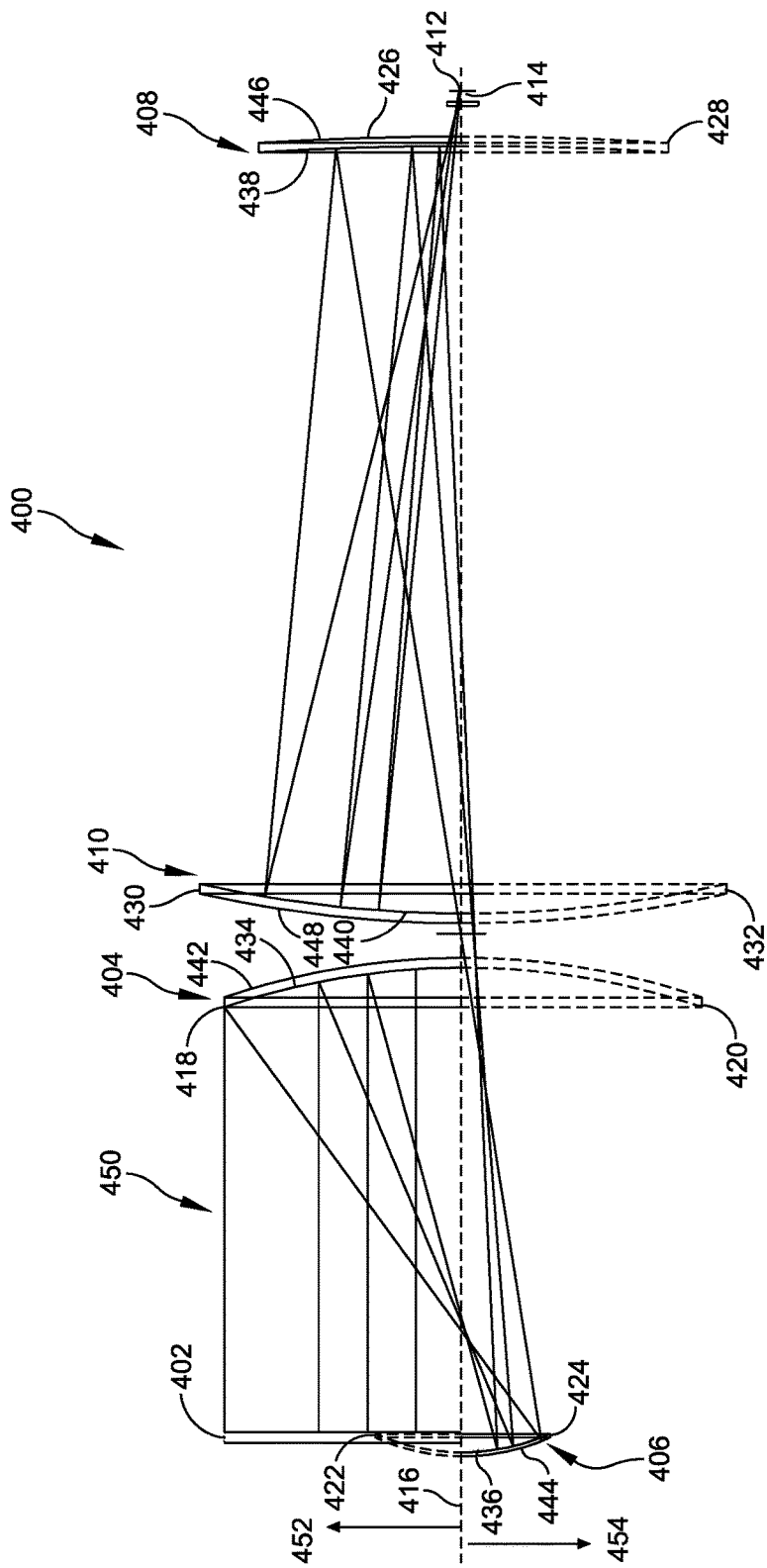
FIG. 9 is a ray trace and schematic optical layout of one example of an on-axis, unobscured reflective telescope according to certain aspects of the present invention.

Referring to FIG. 9, and according to one embodiment, the telescope 400 is a reflecting optical telescope including an entrance aperture 402, a primary mirror 404, a secondary mirror 406, a tertiary mirror 408, a quaternary mirror 410, and an image plane 412. One or more imaging detectors 414 may be placed at the image plane 412. The telescope 400 may be arranged in a housing (not shown) designed to be positioned with a missile (e.g., the nose of a missile). In particular, dimensions of the mirrors 402, 404, 406, 408 may be constrained by the packaging space available in the housing and determined by the cross-section of the missile.

As shown in FIG. 9, the primary mirror 404, the secondary mirror 406, the tertiary mirror 408, and the quaternary mirror 410 are positioned about a linear principal axis 416 that extends between the entrance aperture 402 of the telescope 400 and the image plane 412. In at least one embodiment, the linear principal axis 416 extends from substantially an edge of the entrance aperture 402 to substantially a center of the image plane 412. The linear principal axis 416 of various embodiments provides a virtual guide dividing the telescope into two portions (i.e., sides). The first side is shown in FIG. 9 as an upper side, and the second side is shown in FIG. 9 as a lower side. A first arrow 452 indicates a direction of the first side, and a second arrow 454 indicates a direction of the second side in FIG. 9.

The primary mirror 404, the secondary mirror 406, the tertiary mirror 408, and the quaternary mirror 410, of the telescope 400 may be made from any of several suitable materials, which may be selected based on factors such as, but not limited to, cost and/or weight of the material, and the operational wavelength range(s) of interest. Some examples of materials that may be used to fabricate the mirrors 404, 406, 408, 410 include Aluminum (Al), Beryllium (Be), Silicon Carbide (SiC), and single crystal Silicon (SCSi). Aluminum may be selected for applications in which cost is a significant factor. Silicon or Silicon Carbide may be preferable for systems in which there are thermal challenges. Beryllium may be preferable for applications in which weight is a significant concern. Generally, all four mirrors 404, 406, 408, 410, and structures connecting the mirrors 404, 406, 408, 410, are fabricated from the same material in any given telescope; however, in certain telescopes different materials may be used for the various mirrors 404, 406, 408, 410.

TABLE 1 below provides surface data for an optical prescription for an example of the telescope 400 illustrated in FIG. 9. The optical prescription for this example of the telescope 400 may be generated using an equation which is an industry standard and which would be known to those skilled in the art. For the example given in TABLE 1, the equation was provided by the Zemax® optical design program offered by Zemax, LLC of Kirkland, Wash. It is to be appreciated however, that the prescription given in TABLE 1 is merely exemplary, and that the prescriptions of various embodiments of the telescope 400 are determined by the intended imaging task to be performed by the telescope 400. The units in TABLE 1 are in inches.

TABLE 1

| Surface | Type | Radius | Thickness | Glass | Diameter | Conic |
|---|---|---|---|---|---|---|
| OBJ | Standard | Infinity | Infinity | | 0 | 0 |
| 1 | Standard | Infinity | 10.68 | | 12.29388 | 0 |
| 2 | Standard | Infinity | 1.0125 | | 12.02545 | 0 |
| Stop | Even Asphere | −17.43404 | −12.15049 | Mirror | 12 | −2.516202 |
| 4 | Even Asphere | 5.673634 | 12.96937 | Mirror | 4.368907 | 1.681784 |
| 5 | Standard | Infinity | 19.32196 | | 1.342572 | 0 |
| 6 | Even Asphere | −315.0278 | −19.20749 | Mirror | 10.03958 | −196.9734 |
| 7 | Even Asphere | 26.42714 | 19.23063 | Mirror | 13.19174 | −3.945831 |
| 8 | Even Asphere | 5.469324 | 0.09013675 | ZNSE | 0.9345231 | 106.7767 |
| 9 | Even Asphere | 5.607767 | 0.9569229 | | 0.8960358 | 43.25465 |
| 10 | Even Asphere | −39.61647 | 0.1033098 | Germanium | 0.7797043 | −13936.69 |
| 11 | Even Asphere | −4.410913 | 0.2351531 | | 0.7629593 | 0 |
| Image | Standard | Infinity | | | 0.5732814 | 0 |

For the example given in TABLE 1, the entrance pupil (at the system aperture) has a diameter of 12.00 inches, and the exit pupil has a diameter of 2.129007 inches. The effective focal length, both in air at the system temperature and pressure and in image space, is −21.59481 inches. The back focal length is 0.2338696 inches. The image space f/# is 1.799568, and the stop radius is 6.00 inches. The primary wavelength in this example is 7 μm.

FIGS. 16A and 16B show further surface data, and in particular, aspheric coefficients, for the example of the telescope shown in FIG. 9 corresponding to that provided in TABLE 1. It is to be appreciated that the prescription given in FIGS. 16A and 16B is merely exemplary, and that the prescriptions of various embodiments of the telescope 400 are determined by the intended imaging task to be performed by the telescope 400. The units in FIGS. 16A and 16B are in inches.

The primary mirror 404 receives optical radiation (shown generally as rays 450) from an external scene (not shown) via the entrance aperture 402. The primary mirror 404 is positioned along the linear principal axis 416 that extends between the entrance aperture 402 and the image plane 412. In various embodiments, the primary mirror 404 is positioned on the first side of the linear principal axis 416. As shown, in at least one implementation, positioning the primary mirror 404 on the first side of the linear principal axis 416 may include removing a second portion 420 of the primary mirror 404, the second portion 420 being positioned on the second side of the linear principal axis 416. In such an implementation, incident optical radiation is received and reflected by a first portion 418 of the primary mirror 404, the first portion 418 being positioned on the first side of the linear principal axis 416. In various embodiments, the primary mirror 404 includes at least one reflective surface facing in a direction of the entrance aperture 402 to reflect and direct the received optical radiation across the linear principal axis 416 to the secondary mirror 406. As shown in FIG. 9, because a portion of the secondary mirror 406 is removed, the optical radiation received at the reflective surface is unobstructed by the secondary mirror 406, as would otherwise be the case in a traditional on-axis reflective telescope. Furthermore, the area of the aperture 402 that would have otherwise been blocked by the removed portion of the secondary mirror 406, may then be used to receive optical radiation (as shown).

The secondary mirror 406 receives the optical radiation reflected from the primary mirror 404. FIG. 9 shows the secondary mirror 406 positioned along the linear principal axis 416. In various embodiments the secondary mirror 406 is positioned on the second side of the linear principal axis 416. As shown, in at least one implementation positioning the secondary mirror 406 on the second side of the linear principal axis 416 may include removing a first portion 422 of the secondary mirror 406, the first portion 408 being positioned on the first side of the linear principal axis 416. In such an implementation, incident optical radiation is received and directed by a second portion 424 of the secondary mirror 406, the second portion 424 being positioned on the second side of the linear principal axis 416. In various embodiments, the secondary mirror 406 includes at least one reflective surface facing in a direction of the image plane 412 to reflect and direct the received optical radiation across the linear principal axis 416 to the tertiary mirror 408. Notably, the secondary mirror 406 directs the optical radiation past the primary mirror 404 toward the image plane 412. The optical radiation is received at a portion of the tertiary mirror 408 (and from the tertiary mirror 408 at a portion of the quaternary mirror 410), that are "behind" the first portion 418 of the primary mirror 404. Such an arrangement avoids the sideways concatenation problems of conventional unobscured telescopes, such as the off-axis telescope of FIG. 15.

The tertiary mirror 408 receives optical radiation from the secondary mirror 406. FIG. 9 shows the tertiary mirror 408 positioned along the linear principal axis 416. In various embodiments, the tertiary mirror 408 is positioned on the first side of the linear principal axis 416. As shown, in at least one implementation positioning the tertiary mirror 408 on the first side of the linear principal axis 416 may include removing a second portion 428 of the tertiary mirror 408, the second portion 428 being positioned on the second side of the linear principal axis 416. In such an implementation, incident optical radiation is received and directed by a first portion 426 of the tertiary mirror 408, the first portion 426 being positioned on the first side of the linear principal axis 416. In various embodiments, the tertiary mirror 408 includes at least one reflective surface facing in a direction of the entrance aperture 402 to reflect and direct the received optical radiation to the quaternary mirror 410.

The quaternary mirror 410 receives optical radiation from the tertiary mirror 408. In at least one implementation, optical radiation is directed from the tertiary mirror 408 and received at the quaternary mirror 410 on the first side of the principal primary axis 416. FIG. 9 shows the quaternary mirror 410 positioned along the linear principal axis 416. In various embodiments, the quaternary mirror 410 is positioned on the first side of the linear principal axis 416. As shown, in at least one implementation positioning the quaternary mirror 410 on the first side of the linear principal axis 416 may include removing a second portion 432 of the quaternary mirror 410. The second portion 432 of the quaternary mirror 410 is positioned on the second side of the linear principal axis 416. In such an implementation, incident optical radiation is received and directed by a first portion 430 of the quaternary mirror 410 positioned on the first side of the linear principal axis 416. Notably, the quaternary mirror 410 directs received optical radiation past the tertiary mirror 408 to the image plane 412. As shown in FIG. 9, the optical radiation directed by the quaternary mirror 410 has an unobstructed path of transmission to the image plane 412.

In various embodiments, the one or more imaging detectors 414 are positioned at the image plane to receive the optical radiation from the quaternary mirror 410. In some examples, the imaging detector 414 is an infrared detector. For example, the infrared imaging detector may include a focal plane array (FPA), on which an image of the received optical radiation forms and is quantified with a series of sub-elements that define a pixel array. The detector 414 may include any type of well-known detector assembly capable of producing an image from the received optical radiation. In further embodiments, the detector 414 may be positioned within a Dewar (e.g., cryogenic Dewar). The cryogenic Dewar permits the detector 414 to be cooled for various applications, such as visible light, ultraviolet radiation, short-wave infrared radiation, mid-wave infrared radiation, long-wave infrared radiation, and very-long wave infrared radiation applications.

As discussed herein, each of the primary mirror 404, secondary mirror 406, tertiary mirror 408, and quaternary mirror 410 may include a reflective surface (e.g., reflective surfaces 434, 436, 438, 440) configured to reflect and direct optical radiation, and an opposing back surface (i.e., opposing back surfaces 442, 444, 446, 448). As shown in FIG. 9, in at least one implementation the primary mirror 404 and the quaternary mirror 410 are positioned such that the opposing back surface of each mirror (i.e., surfaces 442 and 448) face one another. In such an arrangement, the secondary mirror 406 may be positioned such that the opposing back surface of the secondary mirror 406 faces the entrance aperture 402, and the tertiary mirror 408 may be positioned such that the opposing back surface of the tertiary mirror 408 faces the image plane 412.

While discussed in certain embodiments with reference to FIG. 9 as having one of a first or second portion (i.e., an upper portion or lower portion) removed, in other embodiments, the telescope 400 may include various combinations of full mirrors and substantially halved mirrors. For instance, in one example a portion of the primary mirror 404 may be removed, a portion of the secondary mirror 406 may be removed, and the tertiary mirror 408 and the quaternary mirror 410 may include a full mirrors having both an upper and a lower portion. In another embodiment, the quaternary mirror 410 may be entirely omitted, or remain unused. Such an embodiment would further reduce the size and weight of the telescope 400. In still other embodiments, one or more of the mirrors 404, 406, 408, 410 may have a first portion that is substantially reflective, and a second portion that, instead of being removed as in the example discussed above, is substantially optically transparent at wavelengths of interest. For example, the first portion 430 of the quaternary mirror 410 may have a reflective coating on the surface (such that this portion acts as the mirror), and the second portion 432 of the quaternary mirror 410 may be uncoated and substantially transparent to optical radiation of wavelengths to be detected by the detector 414 placed at the image plane 412.

Figure 10:
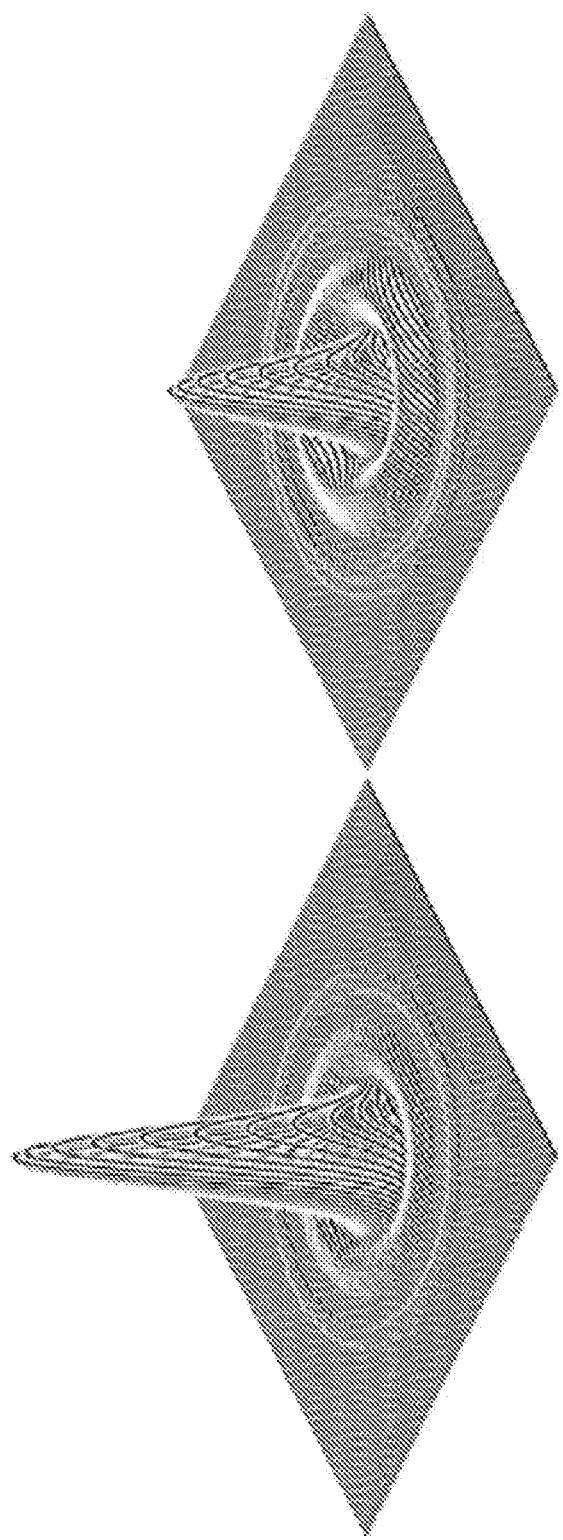
FIGS. 10A and 10B are illustrations of monochromatic Fresnel-Kirchoff diffraction of a circular pupil.

Embodiments of the unobscured reflective telescope, such as that shown in FIG. 9, for example can provide enhanced performance through mitigation of the diffraction effects otherwise caused by the secondary mirror in conventional axisymmetric reflective telescopes as discussed above. FIGS. 10A and 10B illustrate the monochromatic Fresnel-Kirchoff diffraction of a circular pupil. FIG. 10A illustrates the case for an example of the telescope of FIG. 9 in which there is no central obscuration, and FIG. 10B illustrates the comparative case for a 50% linear obstruction (i.e., 25% of the area obscured). FIGS. 10A and 10B are scaled vertically for equal incident flux. As shown, the unobscured telescope design provides significantly improved performance.

Figure 11:
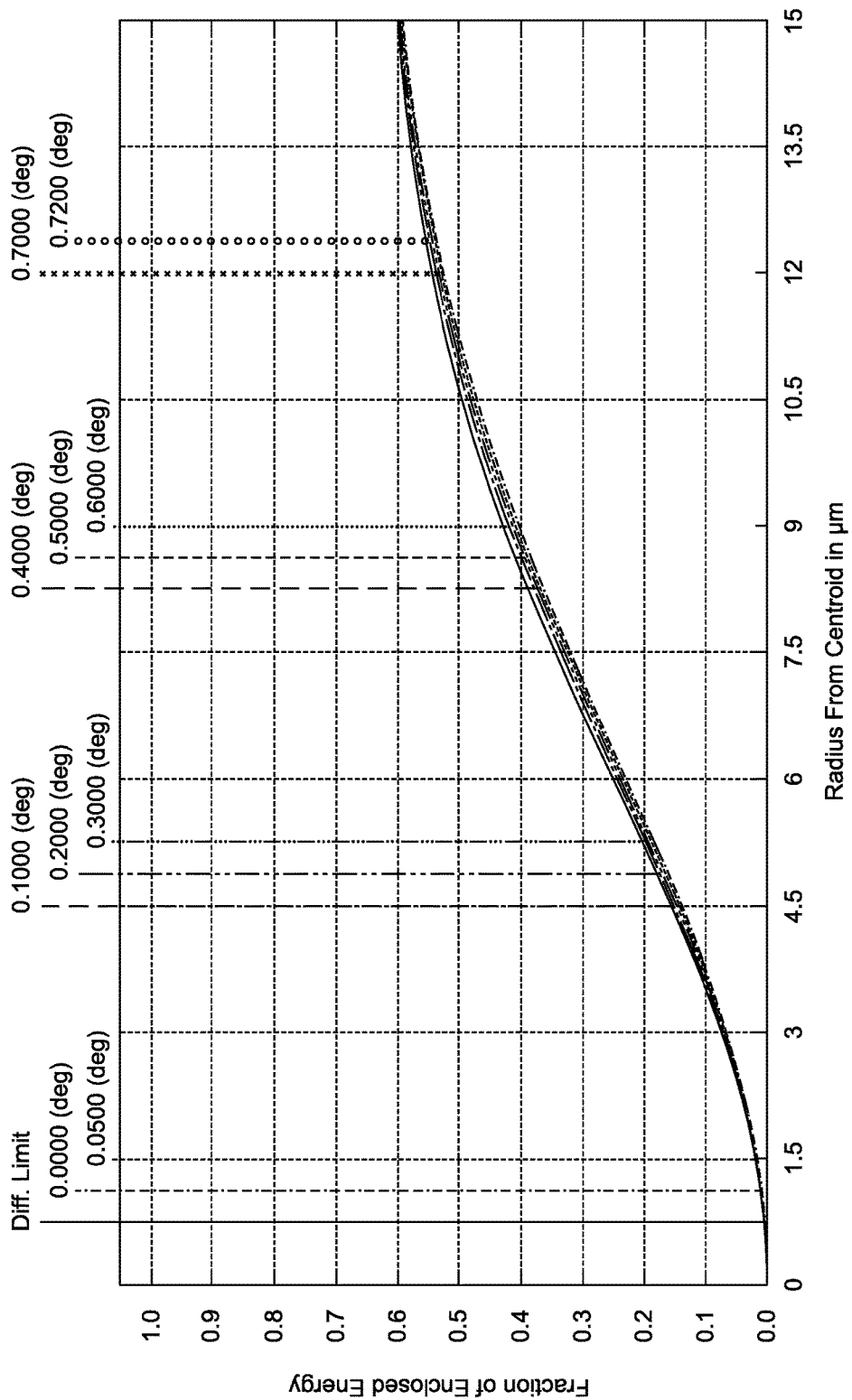
FIG. 11 is a graph illustrating a fraction of enclosed energy as a function of the position of a ray on a detector of the telescope shown in FIG. 9 for different target positions within a field of view, according to certain aspects of the present invention.

FIG. 11 is a graph illustrating the fraction of enclosed energy as a function of a position of a ray of the optical radiation received on the detector for different target positions within a field of view of an example of the telescope, according to one embodiment. Specifically, FIG. 11 illustrates the "enclosed energy," or fraction of total light energy from a viewed scene that falls on one detector element, or pixel of a detector, as a function of the distance (radius) from a centroid of the pixel. The trace labeled "Diff Limit" represents the diffraction limited performance which is the physical limit of the performance achievable by a perfect design. The remaining traces (0.000 deg., 0.0500 deg., 0.1000 deg., 0.2000 deg., 0.3000 deg., 0.4000 deg., 0.5000 deg., 0.6000 deg., 0.7000 deg., 0.7200 deg.) illustrate the results for scenes at different positions within the field of view of the telescope. 0.0000 deg. represents the center of the field of view. FIG. 11 shows that, for a common pixel size of 30 µm (a half width from the centroid being 15 µm), various embodiments perform very near the diffraction limit at scenes viewed both near the center of the field of view and at an edge of the field of view.

Figure 12:
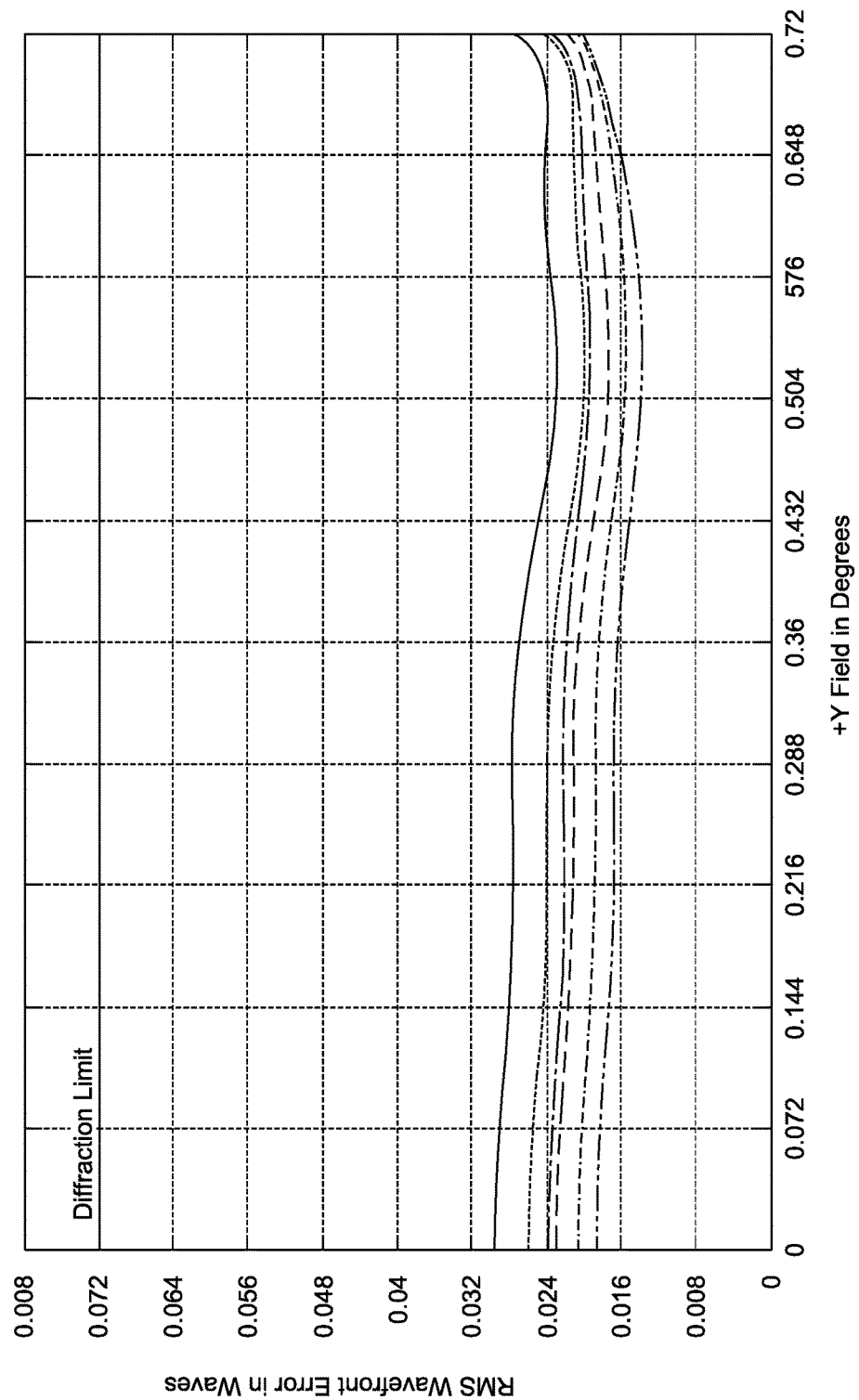
FIG. 12 is a graph illustrating RMS wavefront error in waves as a function of a field of view of the telescope shown in FIG. 9, according to certain aspects of the present invention.

Referring to FIG. 12, shown is a graph illustrating the RMS wavefront error in waves as a function of the field of view of the telescope 400 shown in FIG. 9, according to various aspects. Specifically, FIG. 12 illustrates wavefront deviations that may affect the diffraction limited spot size, or spatial resolution, of the optical radiation imaged by the telescope 400. In particular the RMS wavefront error demonstrates the average wavefront deviation averaged over the particular wavelength of optical radiation. As shown, the RMS wavefront error remains substantially constant, and below the permissible diffraction limit for wavelengths of a polychromatic waveband (i.e., the traces shown in FIG. 12) in various embodiments. Each trace represents the behavior of the telescope 400 for a given wavelength over a field of view. Accordingly, FIG. 12 further demonstrates the improvements of various embodiments when compared to various known on-axis telescope systems.

Figure 13:
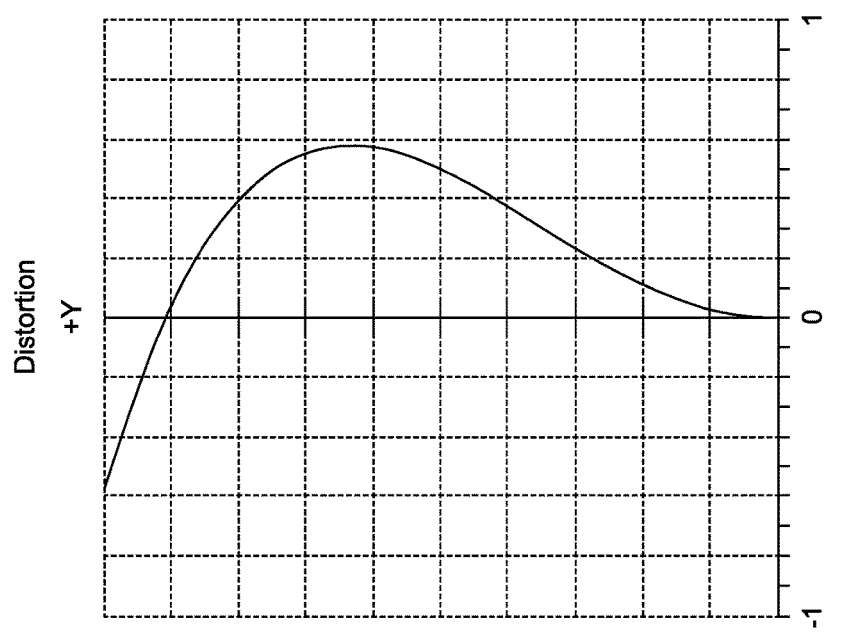
FIG. 13 is a graph illustrating distortion for long infrared wavelengths for one example of the telescope shown in FIG. 9, according to certain aspects of the present invention.

FIG. 13 illustrates the distortion for long infrared wavelengths for one example of the unobscured telescope according to certain aspects. As shown, the distortion may be held well below a common target of 1% image shape distortion.

Figure 14:
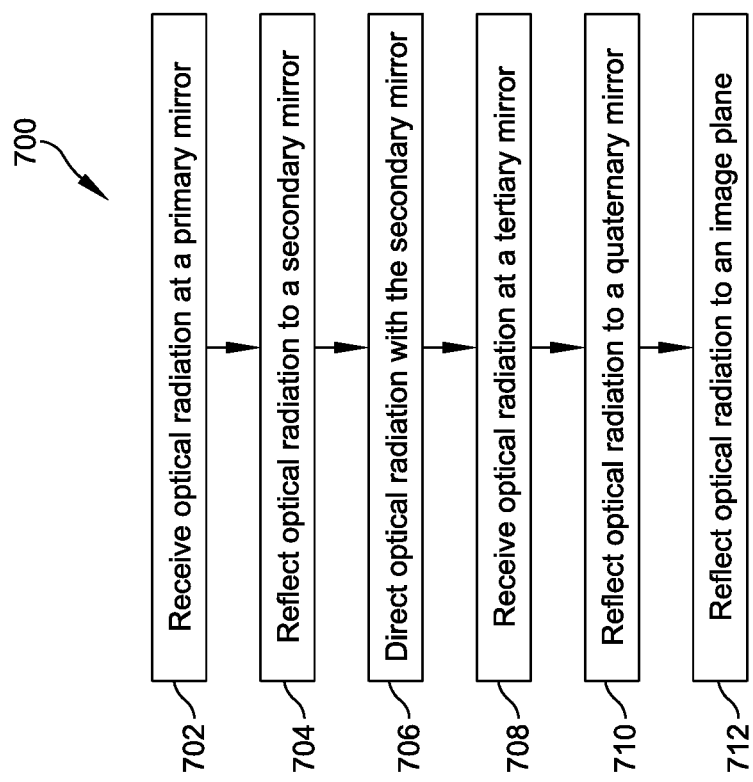
FIG. 14 is a flow diagram illustrating one example of a process for viewing a scene using a reflective telescope according to certain aspects of the present invention.

As described above with reference to FIG. 9, several embodiments perform processes that image a scene. In some instances, these processes are performed by a reflective optical telescope, such as any of the telescopes 100, 200, and 400 described above. One example of such a process is illustrated in FIG. 14. According to this example, the process 700 includes acts of receiving optical radiation at a primary mirror, reflecting the optical radiation to a secondary mirror, receiving the optical radiation at the secondary mirror and directing the optical radiation to a tertiary mirror, receiving the optical radiation from the secondary mirror at the tertiary mirror and reflecting the optical radiation to a quaternary mirror, and reflecting and focusing the optical radiation to an image plane.

In act 702, a primary mirror positioned along a linear principal axis receives optical radiation from a viewed scene via an entrance aperture of the telescope. In several embodiments, the primary mirror has a first portion positioned on a first side of a linear principal axis of the telescope and a second portion positioned on a second side of the linear principal axis. Accordingly, receiving optical radiation from a viewed scene at the primary mirror may include receiving the optical radiation at one of the first portion and the second portion of the primary mirror. In such an embodiment, the other of the first portion and the second portion of the primary mirror may be removed or omitted to reduce the size and weight of the telescope, or simply may remain unused.

In act 704, the primary mirror reflects the optical radiation to a secondary mirror positioned along the linear principal axis. The secondary mirror receives the optical radiation reflected from the primary mirror. In several embodiments, the secondary mirror has a first portion positioned on the first side of the linear principal axis and a second portion positioned on the second side of the linear principal axis. Accordingly, receiving the optical radiation from the primary mirror may include receiving the optical radiation at one of the first portion and the second portion of the secondary mirror. In such an embodiment, the other of the first portion and the second portion of the secondary mirror may be removed or omitted, or simply may remain unused.

In act 706, the secondary mirror directs the optical radiation in substantially a direction of the primary mirror and across the linear principal axis. In various embodiments, the optical radiation directed by the secondary mirror has an unobstructed path of transmission to the tertiary mirror.

In act 708, a tertiary mirror is positioned along the linear principal axis and configured to receive the optical radiation from the secondary mirror. In several embodiments, the tertiary mirror has a first portion positioned on the first side of the linear principal axis and a second portion positioned on the second side of the linear principal axis. Accordingly, receiving the optical radiation directed from the secondary mirror may include receiving the optical radiation at one of the first portion and the second portion of the tertiary mirror. In such an embodiment, the other of the first portion and the second portion of the tertiary mirror may be removed or omitted to further reduce the size and weight of the telescope, or simply may remain unused.

In act 710, the tertiary mirror reflects the optical radiation to a quaternary mirror positioned along the linear principal axis. The quaternary mirror receives the optical radiation from the tertiary mirror. In several embodiments, the quaternary mirror has a first portion positioned on the first side of the linear principal axis and a second portion positioned on the second side of the linear principal axis. Accordingly, receiving the optical radiation from the tertiary mirror may include receiving the optical radiation at one of the first portion and the second portion of the quaternary mirror. In act 712, the quaternary mirror reflects and focuses the optical radiation to an image plane. In further embodiments, one or more detectors positioned at the image plane may receive the optical radiation and detect an image of a scene viewed by the telescope.

Accordingly, aspects and embodiments are directed to an on-axis unobscured telescope and a method of using the same. In particular, the telescope may include a plurality of on-axis mirrors that may be aligned using standard axisymmetric features while removing the central obscuration of known axisymmetric telescopes. Such aspects and embodiments enable a compact telescope that avoids diffraction effects experienced by known on-axis telescopes.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A reflective optical telescope comprising:
a primary mirror positioned along a linear principal axis that extends between an entrance aperture of the reflective optical telescope and an image plane, and configured to receive optical radiation via the entrance aperture, wherein the primary mirror includes a first portion positioned on a first side of the linear principal axis and a second portion positioned on a second side of the linear principal axis, and the optical radiation received via the entrance aperture is reflected entirely by the first portion of the primary mirror;
a secondary mirror positioned along the linear principal axis and configured to receive the optical radiation reflected from the primary mirror and to reflect the optical radiation in substantially a direction of the primary mirror and across the linear principal axis, wherein the optical radiation received by the primary mirror is unobscured by the secondary mirror;
a tertiary mirror positioned along the linear principal axis and configured to receive the optical radiation reflected from the secondary mirror and to reflect the optical radiation toward the primary mirror; and
a quaternary mirror positioned along the linear principal axis and configured to receive the optical radiation reflected from the tertiary mirror and to reflect and focus the optical radiation to the image plane.

2. The reflective optical telescope of claim 1, wherein the secondary mirror includes a first portion positioned on the first side of the linear principal axis and a second portion positioned on the second side of the linear principal axis, and wherein the optical radiation is reflected entirely by the second portion of the secondary mirror.

3. The reflective optical telescope of claim 2, wherein the secondary mirror is a concave mirror.

4. The reflective optical telescope of claim 2, wherein the tertiary mirror includes a first portion positioned on the first side of the linear principal axis and a second portion positioned on the second side of the linear principal axis, and wherein the optical radiation is reflected entirely by the first portion of the tertiary mirror.

5. The reflective optical telescope of claim 4, wherein the quaternary mirror includes a first portion positioned on the first side of the linear principal axis and a second portion positioned on the second side of the linear principal axis, and wherein the optical radiation is reflected entirely by the first portion of the quaternary mirror.

6. The reflective optical telescope of claim 1, wherein the primary mirror has a first reflective surface configured to receive and reflect the optical radiation, wherein the secondary mirror has a second reflective surface configured to receive and reflect the optical radiation, wherein the tertiary mirror has a third reflective surface configured to receive and reflect the optical radiation, and wherein the quaternary mirror has a fourth reflective surface configured to receive and reflect the optical radiation to the image plane.

7. The reflective optical telescope of claim 6, wherein the primary mirror has a first back surface distal the first reflective surface, wherein the quaternary mirror has a second back surface distal the fourth reflective surface, and wherein the primary mirror and the quaternary mirror are positioned such that the first and second back surfaces face one another.

8. The reflective optical telescope of claim 1, wherein the secondary mirror is a concave mirror.

9. A reflective optical telescope comprising:
a primary mirror positioned on a first side of a linear principal axis that extends between an entrance aperture of the reflective optical telescope and an image plane, the primary mirror configured to receive optical radiation via the entrance aperture and to reflect the optical radiation, the reflective optical telescope configured to direct the optical radiation from the entrance aperture to the image plane;
a secondary mirror positioned along and on a second side of the linear principal axis and configured to receive the optical radiation reflected from the primary mirror and to reflect the optical radiation past the primary mirror toward the image plane and across the linear principal axis;
a tertiary mirror positioned along and on the first side of the linear principal axis and configured to receive the optical radiation reflected from the secondary mirror and to further reflect the optical radiation in a direction of the primary mirror; and
a quaternary mirror configured to receive the optical radiation reflected from the tertiary mirror and to further reflect the optical radiation to the image plane.

10. The reflective optical telescope of claim 9, wherein the quaternary mirror is positioned entirely on the first side of the linear principal axis.

11. The reflective optical telescope of claim 9, wherein the primary mirror has a first reflective surface configured to receive and reflect the optical radiation and a first opposing back surface, wherein the quaternary mirror has a second reflective surface configured to receive and reflect the optical radiation and a second opposing back surface, and wherein the primary mirror and the quaternary mirror are positioned such that the first and second opposing back surfaces face one another.

12. The reflective optical telescope of claim 11, wherein the secondary mirror has a third reflective surface configured to receive and reflect the optical radiation and a third opposing back surface, wherein the tertiary mirror has a fourth reflective surface configured to receive and reflect the optical radiation and a fourth opposing back surface, and wherein the secondary mirror is positioned such that the third opposing back surface faces the entrance aperture and the tertiary mirror is positioned such that the fourth opposing back surface faces the image plane.

13. A method of observing a scene comprising:
receiving optical radiation from a viewed scene at a primary mirror positioned along a linear principal axis that extends between an entrance aperture of a reflective optical telescope and an image plane;
reflecting the optical radiation from the primary mirror to a secondary mirror positioned along the linear principal axis, the secondary mirror being positioned relative to the primary mirror such that the secondary mirror does not obscure any portion of the entrance aperture and the optical radiation received by the primary mirror is unobscured by the secondary mirror;
directing the optical radiation with the secondary mirror in substantially a direction of the primary mirror and across the linear principal axis;

receiving the optical radiation directed from the secondary mirror at a tertiary mirror positioned along the linear principal axis;

reflecting the optical radiation from the tertiary mirror to a quaternary mirror positioned along the linear optical axis; and directing the optical radiation to the image plane with the quaternary mirror.

\* \* \* \* \*